(12) United States Patent
Miyamoto et al.

(10) Patent No.: US 12,541,213 B2
(45) Date of Patent: Feb. 3, 2026

(54) DISTRIBUTED COORDINATION SYSTEM AND TASK EXECUTION METHOD

(71) Applicant: Hitachi, Ltd., Tokyo (JP)

(72) Inventors: Atsushi Miyamoto, Tokyo (JP); Kiyoto Ito, Tokyo (JP); Hiroyuki Mizuno, Tokyo (JP)

(73) Assignee: HITACHI, LTD., Tokyo (JP)

( * ) Notice: Subject to any disclaimer, the term of this patent is extended or adjusted under 35 U.S.C. 154(b) by 360 days.

(21) Appl. No.: 18/022,332

(22) PCT Filed: Nov. 18, 2021

(86) PCT No.: PCT/JP2021/042459
§ 371 (c)(1),
(2) Date: Oct. 2, 2023

(87) PCT Pub. No.: WO2022/153669
PCT Pub. Date: Jul. 21, 2022

(65) Prior Publication Data
US 2024/0051132 A1 Feb. 15, 2024

(30) Foreign Application Priority Data
Jan. 18, 2021 (JP) ................. 2021-005426

(51) Int. Cl.
G05D 1/698 (2024.01)
(52) U.S. Cl.
CPC ................. G05D 1/6983 (2024.01)
(58) Field of Classification Search
CPC .... G05D 1/0219; G05D 1/648; G05D 1/0274; G05D 1/0214; G05D 1/0088;
(Continued)

(56) References Cited

U.S. PATENT DOCUMENTS

| 10,537,996 B2* | 1/2020 | Egerstedt ............. G05D 1/0027 |
| 2015/0345967 A1* | 12/2015 | Meuleau ............ G01C 21/3453 701/25 |

(Continued)

FOREIGN PATENT DOCUMENTS

| EP | 3718704 A1 | 10/2020 |
| JP | 2019-021973 A1 | 2/2019 |

(Continued)

OTHER PUBLICATIONS

International Search Report of PCT/JP2021/042459 dated Feb. 1, 2022.

*Primary Examiner* — Abby Lin
*Assistant Examiner* — Kayla R. Doros
(74) *Attorney, Agent, or Firm* — MATTINGLY & MALUR, PC

(57) ABSTRACT

An autonomous distributed coordination system for a broad-area search in an unknown environment without the need for a prior plan and map sharing. It includes: a sensor input processing section for acquiring (i) relative position information relative to another mobile body, (ii) path information in past and (iii) surrounding shape information; other mobile body avoidance module for generating, based on the relative position information, a first action candidate for avoiding the another mobile body; a past path avoidance module for generating, based on the path information, a second action candidate for avoiding the past path; an obstruct avoidance module for generating, based on the depth information, a third action candidate for avoiding a surrounding obstruct; and an integration module for determining a velocity or angular velocity of the mobile body based on the first action candidate, the second action candidate and the third action candidate.

14 Claims, 11 Drawing Sheets

(58) Field of Classification Search
CPC ............. G05D 2109/10; G05D 1/0027; G05D 1/0291; G05D 2105/55; G05D 2107/40; G05D 1/6983; G05D 2107/36; G05D 1/0289; G05D 1/0238; G01C 21/206; G01C 21/3804; G06V 20/56; G06V 20/58; G01B 11/026; B25J 9/1666

See application file for complete search history.

(56) References Cited

U.S. PATENT DOCUMENTS

| | | | |
|---|---|---|---|
| 2018/0136662 A1* | 5/2018 | Kim | G05D 1/0214 |
| 2018/0173223 A1* | 6/2018 | Doane | G01C 21/20 |
| 2019/0049250 A1* | 2/2019 | Takaoka | G01C 21/005 |
| 2019/0120633 A1* | 4/2019 | Afrouzi | G01S 7/4808 |
| 2020/0230820 A1* | 7/2020 | Watanabe | B25J 9/1697 |
| 2020/0338733 A1* | 10/2020 | Dupuis | G05D 1/0291 |
| 2020/0361412 A1 | 11/2020 | Ogawa et al. | |
| 2021/0004611 A1* | 1/2021 | Garimella | G08G 1/166 |
| 2021/0365040 A1 | 11/2021 | Tomono et al. | |

FOREIGN PATENT DOCUMENTS

| | | |
|---|---|---|
| JP | 2019-121179 A | 7/2019 |
| WO | 2020/035902 A1 | 2/2020 |

\* cited by examiner

ESCAPE TO OUTSIDE OF UNSEARCHED AREA ALONG WALL BY
(1) STRAIGHT-AHEAD ACCELERATION IF STRAIGHT-AHEAD MOTION IS POSSIBLE,
(2) MAKING CHANGE IN DIRECTION IF STRAIGHT-AHEAD MOTION IS IMPOSSIBLE.

DISTRIBUTED COORDINATION SYSTEM AND TASK EXECUTION METHOD

TECHNICAL FIELD

The present invention relates to an autonomous distributed coordination system in a broad-area search.

BACKGROUND ART

In the coordination robotic system to allow a plurality of robots to perform a task in coordination with one another in a specific environment, many practical systems need a host machine as a centralized calculator. For example, there is a coordination robotic system based on a prior plan in a search task of searching the entire region by a plurality of robots. In the method, all the robots are previously provided with a shared map, so that the individual robots are equally assigned regions of responsibility with a prior plan. In an event where a robot suffers a breakdown or delays in action, there is a risk of not completing the task as a whole and/or an issue of significant preprocessing for the prior plan.

As another means, there is a coordination robotic system based on a shared map. In the method, position information of the respective robots is collected into the centralized calculator, and actions of the respective robots are collectively calculated from the obtained all position information. There is a need to create a shared map with a common coordinate system among all the robots, leading to integration of position information into the preprocessing and/or the shared map and an issue of increased cost such as for communications and the like.

In particular, bearing in mind a search, search operation and the like such as in disaster situations, in emergency and the like, the possibilities arise that details of an environment may not be easily grasped in advance, and/or malfunction may occur to make communications with a centralized system impossible, leading to increasingly salient issues regarding the prior plan and the sharing of a map. In this case, there is a need for a distributed coordination robotic system capable of more autonomously moving robots. Examples of tasks include to find an injured person, to detect a surrounding abnormal event, to monitor a suspicious person, and the like.

As autonomous distributed coordination robotic systems, for example, PTL 1 discloses an autonomous mobile body that appropriately avoids an oncoming autonomous mobile body and executes an assigned task.

CITATION LIST

Patent Literature

PTL 1: Japanese Patent Application Laid-Open No. 2019-21973

SUMMARY OF INVENTION

Technical Problem

The technology disclosed in PTL 1 is to generate an avoidance path to execute an avoidance operation when estimating the likelihood of making contact with an obstacle or another oncoming robot which are monitored by an external sensor. Without control by the centralized calculator, the avoidance action may offer an action without collision with the obstacle and another robot. However, on the assumption of a broad-area search such as in disaster situations, in emergency and the like, if the broad-area search or the like is attempted to be efficiently executed by a plurality of robots, only the avoidance action using only the surrounding information is insufficient. For example, if the search area may overlap a search area of another robot, and if the same place is repeatedly searched, they result in a significant reduction in search efficiency. For efficiently implementing a broad-area search in an unknown environment by a plurality of robots, in addition to the local avoidance action, appropriate burden-sharing among the individual robots is required to establish a robotic system to make coordination as a whole task.

The present invention has been made in view of issues as described above, and it is an object of the present invention to provide an autonomous distributed coordination system that is intended to be used for, in particular, a broad-area search in an unknown environment without the need for a prior plan and map sharing.

Solution to Problem

To achieve the above object, an aspect of the present invention provides a distributed coordination system for executing a predetermined task by a plurality of mobile bodies, the system including: a sensor input processing section for acquiring relative position information relative to another mobile body, path information in past and shape information of surroundings; and an action plan processing section. The action plan processing section includes: other mobile body avoidance module for generating, based on the relative position information, a first action candidate for avoiding the another mobile body; a past path avoidance module for generating, based on the path information, a second action candidate for avoiding the past path; an obstruct avoidance module for generating, based on the shape information, a third action candidate for avoiding a surrounding obstruct; and an integration module for determining a velocity or an angular velocity of the mobile body based on the first action candidate, the second action candidate and the third action candidate.

To achieve the above object, another aspect of the present invention also provides a task execution method for executing a predetermined task by a plurality of mobile bodies, the method including: a sensor input processing step of acquiring, based on sensor data of sensors installed with the mobile body, relative position information relative to another mobile body, path information in past and shape information of surroundings; and an action plan processing step. The action plan processing step includes: other mobile body avoidance processing for generating, based on the relative position information, a first action candidate for avoiding the another mobile body; past path avoidance processing for generating, based on the path information, a second action candidate for avoiding the past path; obstruct avoidance processing for generating, based on the shape information, a third action candidate for avoiding a surrounding obstruct; and integration processing for determining a velocity or an angular velocity of the mobile body based on the first action candidate, the second action candidate and the third action candidate.

Advantageous Effects of Invention

According to the present invention, a distributed coordination system is implemented which, in a broad-area search task in an unknown environment, is able to conduct a coordinate search in such a manner as to prevent interference with another robot and an obstacle while efficiently expanding the search area. The task execution method is also implemented. These and other problems, configurations and advantageous effects will be apparent from embodiments in the following description.

DESCRIPTION OF EMBODIMENTS

Exemplary embodiments according to the present invention will now be described with reference to the accompanying drawings. In the accompanying drawings, like reference signs indicate functionally similar elements. It is to be understood that, although the accompanying drawings illustrate specific examples in accordance with the principle of the present invention, they are used for the purpose of providing an understanding of the present invention and should not be construed to limit the invention.

Example 1

Example 1 is of an exemplary embodiment of a distributed coordination robotic system with robots each installed with a plurality of sensors.

Specifically, the exemplary embodiments are of a distributed coordination robotic system and a task execution method thereof, in which a distributed coordination system for executing a predetermined task by a plurality of mobile bodies is configured with a robot including: a sensor input processing section for acquiring relative position information relative to another robot, past path information and shape information of surroundings; and an action plan processing section. The action plan processing section includes: other robot avoidance module for generating, based on the relative position information, a first action candidate for avoiding another robot; a past path avoidance module for generating, based on the path information, a second action candidate for avoiding the past path; an obstruct avoidance module for generating, based on the shape information, a third action candidate for avoiding a surrounding obstruct; and an integration module for determining a velocity and an angular velocity of the robot based on the first action candidate, the second action candidate and the third action candidate.

Example 1 is of exemplary embodiments of a distributed coordination robotic system for implementing the broad-area search task in an unknown environment such as a building interior in which a position measuring means such as GPS (Global Positioning System) or the like is unavailable, and the like. First, the broad-area search task of the distributed coordination robotic system according to Example 1 and a basic hardware configuration of an intended robot will be described.

Figure 1:
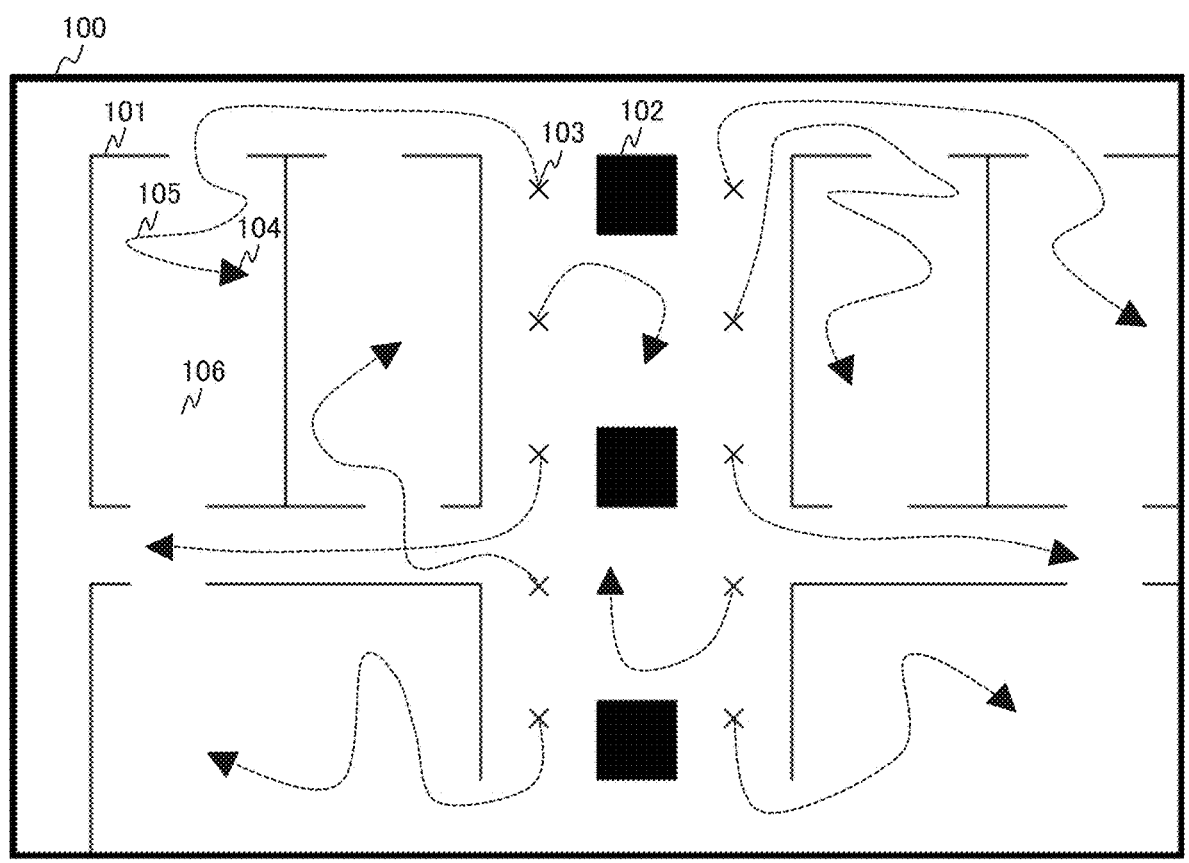
FIG. 1 is a diagram describing an example of broad-area search tasks of a distributed coordination robotic system according to Example 1.

FIG. 1 is a diagram describing an example of the broad-area search tasks of the distributed coordination robotic system according to Example 1. The outer frame in FIG. 1 indicates a building interior 100, a straight line within the building interior 100 indicates a wall 101, a black-filled square indicates a post 102, and a space surrounded by the walls 101 indicates a room 106. A cross symbol indicates a start point 103 of a robot. A triangle symbol indicates a robot 104. A curved dotted line indicates a robot trajectory 105. FIG. 1 depicts an example where ten robots 104 begin a search of the six rooms 106 in the building interior 100 from a central space in coordination with one another.

In FIG. 1, the ten robots 104 automatically start up, for example, upon detection of an emergency event, and begin a search from the start points 103. The startup may be caused by external communications. The ten robots 104 perform the search task in coordination with one another, and then upon completion of the task, they stop the search. Here, the completion of the task is determined, for example, by finding a specific target, when a predetermined length of time has elapsed, by checking the remaining amount of power supply, or the like. Actions after the completion may include, for example, stopping on the spot, returning to the start point, and the like. It will be appreciated that the layout of the building interior in FIG. 1 and the number of robots 104 are presented for the purpose of illustration only and not of limitation. Although the building interior is shown by way of example, the same holds true in the case of an outdoor area. In the case of the outdoor area, a range of a task (search) may be preset, for example, setting a target object, a fence and the like as a perimeter of the task range may be possible.

Figure 2:
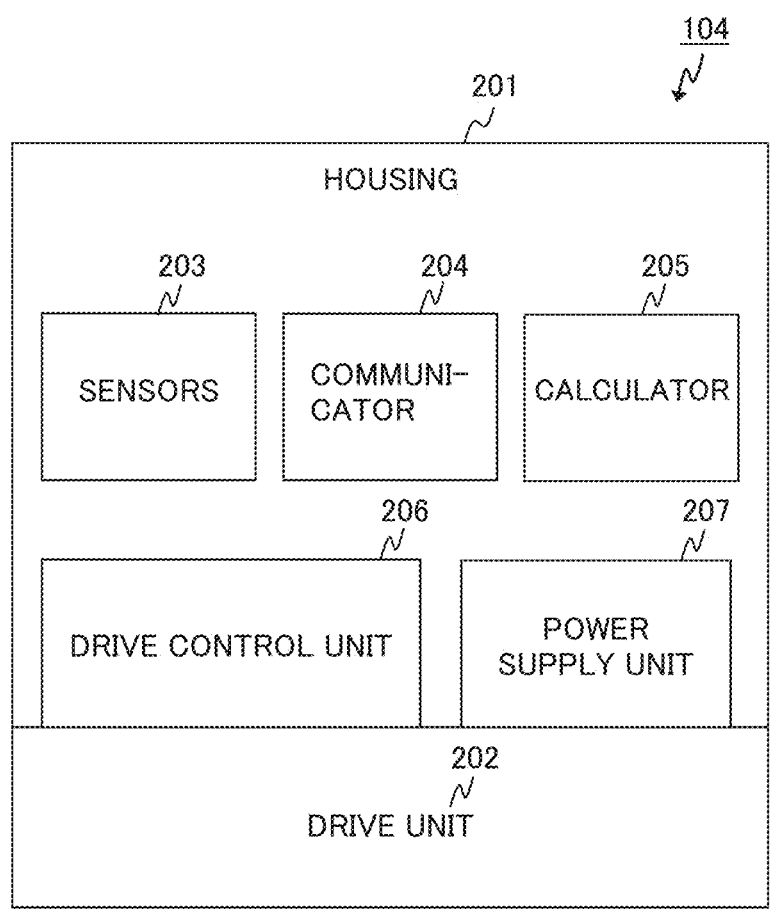
FIG. 2 is a block diagram illustrating an example apparatus configuration in each robot of the distributed coordination robotic system according to Example 1.

FIG. 2 is a block diagram illustrating an example hardware configuration of the robot according to Example 1. The robot 104 shown in FIG. 2 is configured with a housing 201 and a drive unit 202. The housing 201 encloses sensors 203, a communicator 204, a calculator 205, a drive control unit 206 and a power supply unit 207. The housing 201 is a box that houses components of the robot body. The drive unit 202 includes a motor as a power source of the robot, wheels, propellers and/or the like.

The sensors 203 are sensors detecting actions of the robot 104 and surrounding conditions, including a vision sensor such as a camera and the like, an IMU (Inertial Measurement Unit), and a depth sensor for acquiring surrounding shape information, as well as various auxiliary sensors and the like. The communicator 204 is an apparatus for external communications, and an apparatus for detecting a radio wave intensity, including general-purpose communicators such as standardized near field communication, and the like. The calculator 205 is a brain planning robot actions, including, for example, a processor 210, memory 211, an interface 212 and a storage device 213 as a hardware configuration. The drive control unit 206 includes a control board for directly controlling the drive unit, and/or the like. The power supply unit 207 includes a battery and the like, sharing the power supply with the robot 104.

The robot 104 collects data about the surrounding conditions from the sensors 203 and the communicator 204, and processes the collected data at the calculator 205 to generate a control command, so that the robot 104 initiates action by actuating the drive unit 202 through the drive control unit 206.

The distributed coordination robotic system according to Example 1 executes the following three processes with information as three inputs thereto: relative position information which is information showing the positional relationship with another robot calculated and obtained from data of the sensors 203 and the communicator 204; past path information which is information showing a path along which its own robot has moved in the past; and shape information which is information showing a shape of a physical object around its own robot. Thereby, the distributed coordination robotic system predicts an action of avoiding another robot, an action of avoiding a path taken in the past, and an action of avoiding an obstacle.

1) Other robot avoidance processing
2) Past path avoidance processing
3) Obstacle avoidance processing Further, integrating them enables execution of a broad-area search of the robots without a prior plan and the sharing of a map. All the functions are implemented, for example, as program modules of the calculator 205. The functions are stored in the memory of the calculator 205 of each robot 104 and are sequentially read and executed into the processor of the calculator 205. Next, a system and processing for implementing the functions will be described.

Figure 3:
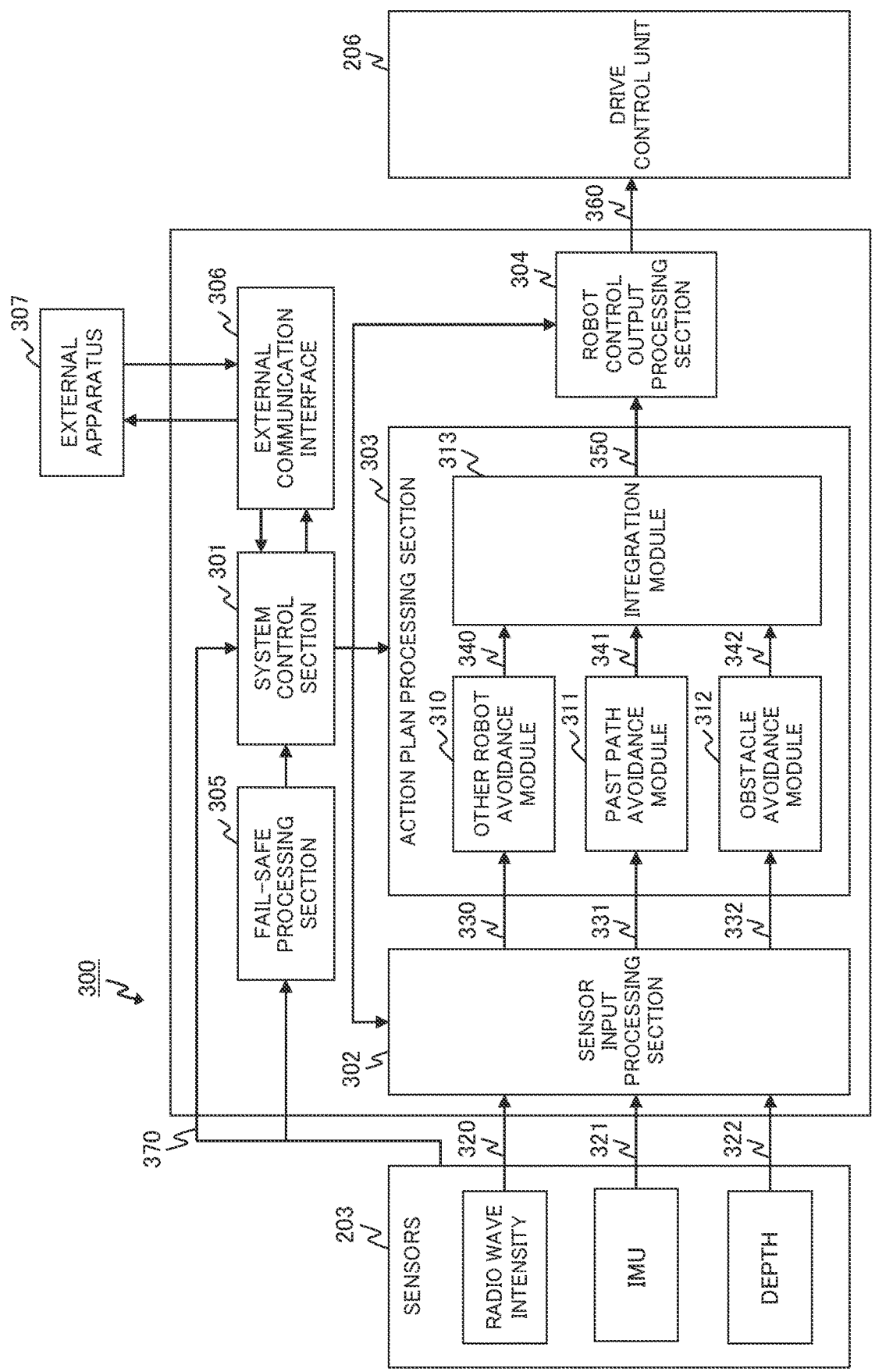
FIG. 3 is a functional block diagram illustrating one of example configurations of a robotic system of each robot according to Example 1.

FIG. 3 is a functional block diagram illustrating one of example configurations of a robotic system of each robot according to Example 1. A robotic system 300 is incorporated in each of the robots 104, and is configured with a system control section 301, a sensor input processing section 302, an action plan processing section 303, a robot control output processing section 304, a fail-safe processing section 305, an external communication interface 306, and the like. In turn, the action plan processing section 303 is configured with an other robot avoidance module 310, a past path avoidance module 311, an obstacle avoidance module 312 and an integration module 313.

When receiving the initiation of processing, the system control section 301 starts up the entire system. The system control section 301 starts up the other program modules, and then waits for the system to be stabilized, and makes the sensor input processing section 302, the action plan processing section 303, the robot control output processing section 304 and the fail-safe processing section 305 ready to execute. Also, where a fail-safe is operated by the fail-safe processing section 305 to create a need to stop the action plan processing, the robot is controlled to be stopped by generating an interrupt to the robot control output section 304.

The sensor input processing section 302 converts the data obtained as inputs from the sensors 203 and the communicator 204, into a format easily processed by the action plan processing section 303. As inputs to the sensor input processing section 302, radio-wave intensity information 320 emitted by communication equipment of a robot is utilized for establishing the positional relationship with other robots, IMU information 321 on the robot fuselage is utilized for estimating its own path, and depth sensor information 322 on a laser depth sensor and/or a depth sensor such as a depth camera and the like is utilized for measuring a distance to and/or a shape of an obstacle. The sensor input processing section 302 generates from the above data, relative position information 330, past path information 331 and shape information 332. Also, where a sensor value includes a lot of noise, filtering processing is combinedly performed to reduce the noise.

The action plan processing section 303 uses the relative position information 330, the past path information 331 and the shape information 332, which are obtained by the sensor input processing section 302, to execute an action plan and generate an action command 350. The action plan processing section 303 includes the other robot avoidance module 310, the past path avoidance module 311 and the obstacle avoidance module 312 respectively corresponding to the relative position information 330, the past path information 331 and the shape information 332. The integration module 313 integrates action candidates 340 to 342 which are generated from the modules, and generates the action command 350.

The robot control output processing section 304 converts the generated action command 350 into a velocity instruction 360 to be processed by the drive control unit 206, and then passes the velocity instruction 360 to the drive control unit 206. The velocity instruction 360 passed to the drive control unit 206 is velocity information having a velocity component, angular acceleration component. Also, where a stop instruction interrupts, the system control section 301 writes all the elements of the velocity information over zero.

The fail-safe processing section 305 determines and detects a dangerous condition with the sensor input 370 as an input thereto. If a condition is determined to be dangerous, the fail-safe processing section 305 operates the system control section 301 to stop the robot. For example, an input of the depth sensor is used as a sensor input to make emergency stop when an obstacle suddenly appears in the direction of travel and/or the like, alternatively the remaining battery life is used as a sensor input to stop the system with safety before reaching a limit of activity, and/or the like.

Finally, the external communication interface 306 is an interface for performing communications with an external apparatus 307, which is used for externally receiving initial startup and transmitting a search result and/or log information to the outside.

Execution programs for the above processes and information used during execution of the programs in question are stored in the memory 211 of the calculator 205. The processor 210 executes the programs in question to implement various functions of the robotic system 300. In the following description, when the processing is described mainly using a functionality section, this means that the program implementing the functionality section in question is executed by the processor.

Also, the programs executed by the processing sections may be written by, for example, software for supporting a robot application such as ROS (Robot Operating System). If ROS and/or the like is used, each processing section is designed as a node. Each node operates independently, and exchange of each piece of information is implemented by message communications between nodes.

Figure 4:
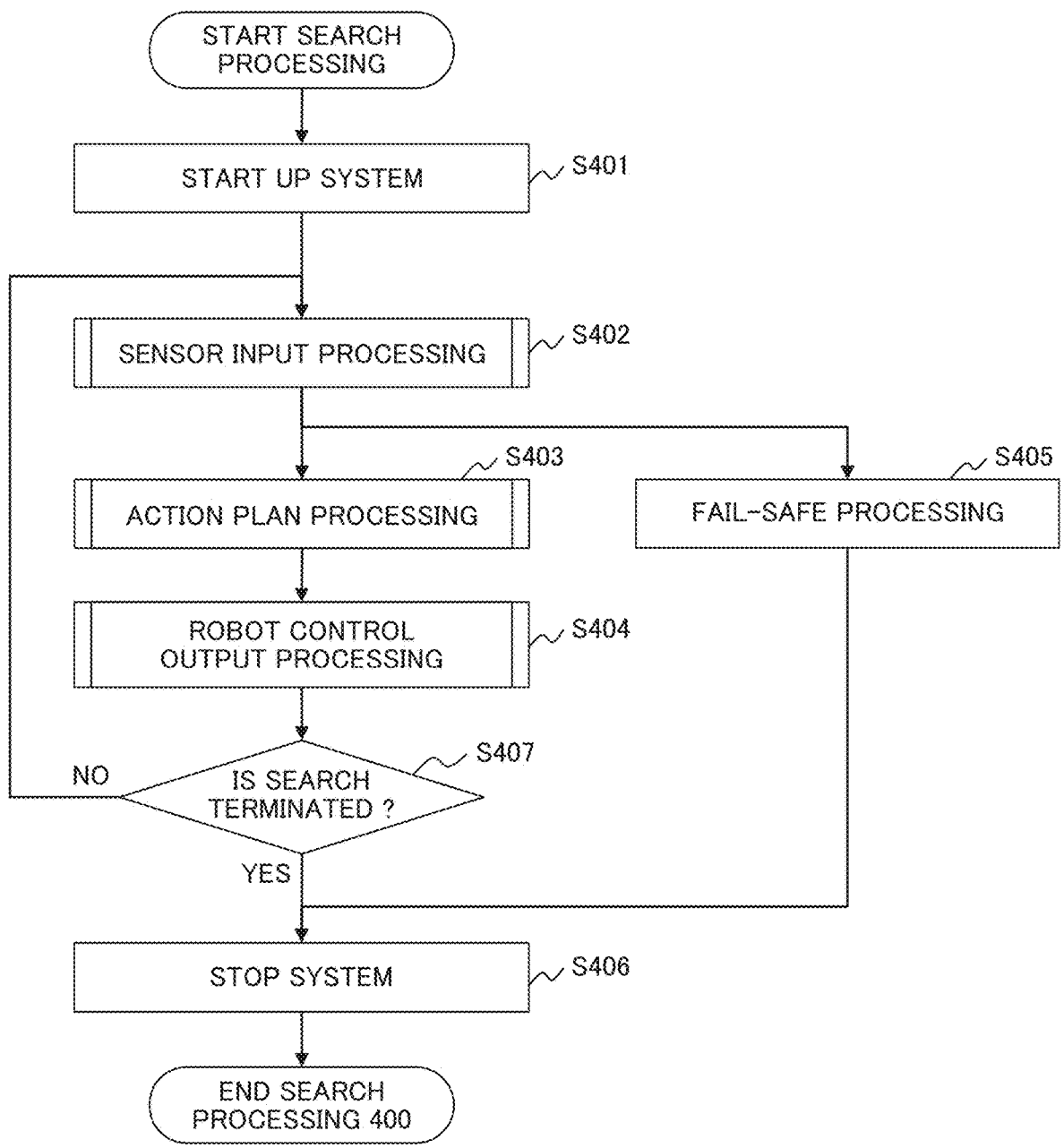
FIG. 4 is a flowchart for describing an overview of processing executed by a robotic system 300 according to Example 1.

A flow of processing executed by the robotic system 300 according to the exemplary embodiments will now be described in detail. FIG. 4 is a flowchart for describing an overview of search processing executed by the robotic system 300 according to Example 1, which includes a system start-up step S401, a sensor input processing step S402, an action plan processing step S403, a robot control output processing step S404, a fail-safe processing step S405, and a system stop step S406. The robotic system 300 execute each process detailed below.

System Start-up Step S401

At the system start-up step S401, the robotic system 300 is started up. Specifically, the system control section 301 executes the system start-up. If the system control section 301 receives a start from the external apparatus 307 through the external communication interface 306, the system control section 301 starts up the other program modules, then waits for the system to be stabilized, and makes the sensor input processing S402, the action plan processing S403, the robot control output processing S404 and the fail-safe processing S406 ready to be executed.

Sensor Input Processing Step S402

At the sensor input processing step S402, for the purpose of establishing the positional relationship with other robots, for example, relative position information 330 relative to other robots is generated with the radio wave intensity information 320 emitted by the robot's communication equipment as an input. The relative position information 330 is data representing directions and/or distances between its own current position and all the other robot bodies detected.

The relative position information 330 is calculated and obtained, for example, from data on the intensity of radio waves emitted by a communication module of another robot, and used to determine a position and a distance of another robot relative to its own robot. Even if the radio wave intensity data is not used, for example, a camera may be used to estimate a direction and a distance from another robot based on how it appears on a camera image and/or based on three-dimensional measurement by a stereo camera. Alternatively, another means may be used to determine a direction and/or a distance from another robot.

At the sensor input processing step S402, also, for example, past path information 331 on its own body is generated with the IMU information 321 on the robot fuselage as an input thereto in order to estimate a path of its own body. The past path information 331 on its own body is information on a trajectory calculated by summing the own IMU information from the start point, which is time-series data on coordinates acquired at fixed timing.

Stated another way, the past path information is calculated and obtained from the data of the sensors 203 and used to determine whether or not the next action of its own body is taken around a position through which its own body has passed previously.

At the sensor input processing step S402, further, for example, for the purpose of measuring a distance from an obstacle, the shape information 332 is generated with the depth sensor information 322 of the depth sensor as an input thereto. For example, where the depth camera is used, the shape information 332 is information on a point cloud acquired corresponding to pixels of the camera. At each point, a luminance value corresponding to a depth (distance) to a physical object is set. If a sensor value includes a lot of noise, filtering processing and/or the like may be combinedly performed to reduce the noise. In this way, the shape information is calculated and obtained from the sensor data, and is used to determine whether or not an obstacle is located within a safe range for the next action of its own body.

Specifically, the above sensor input processing S402 is executed by the sensor input processing section 302. The relative position information 330, the past path information 331 and the shape information 332 which have been thus generated are passed to the action plan processing section 303, so that the processing transitions to the action plan processing step S403.

Action Plan Processing Step S403

At the action plan processing step S403, the relative position information 330, the past path information 331 and the shape information 332 which have been generated are used to generate a first action candidate 340 for avoiding another robot, a second action candidate 341 for avoiding a past path of its own body, and a third action candidate 342 for avoiding an obstacle.

Figure 5:
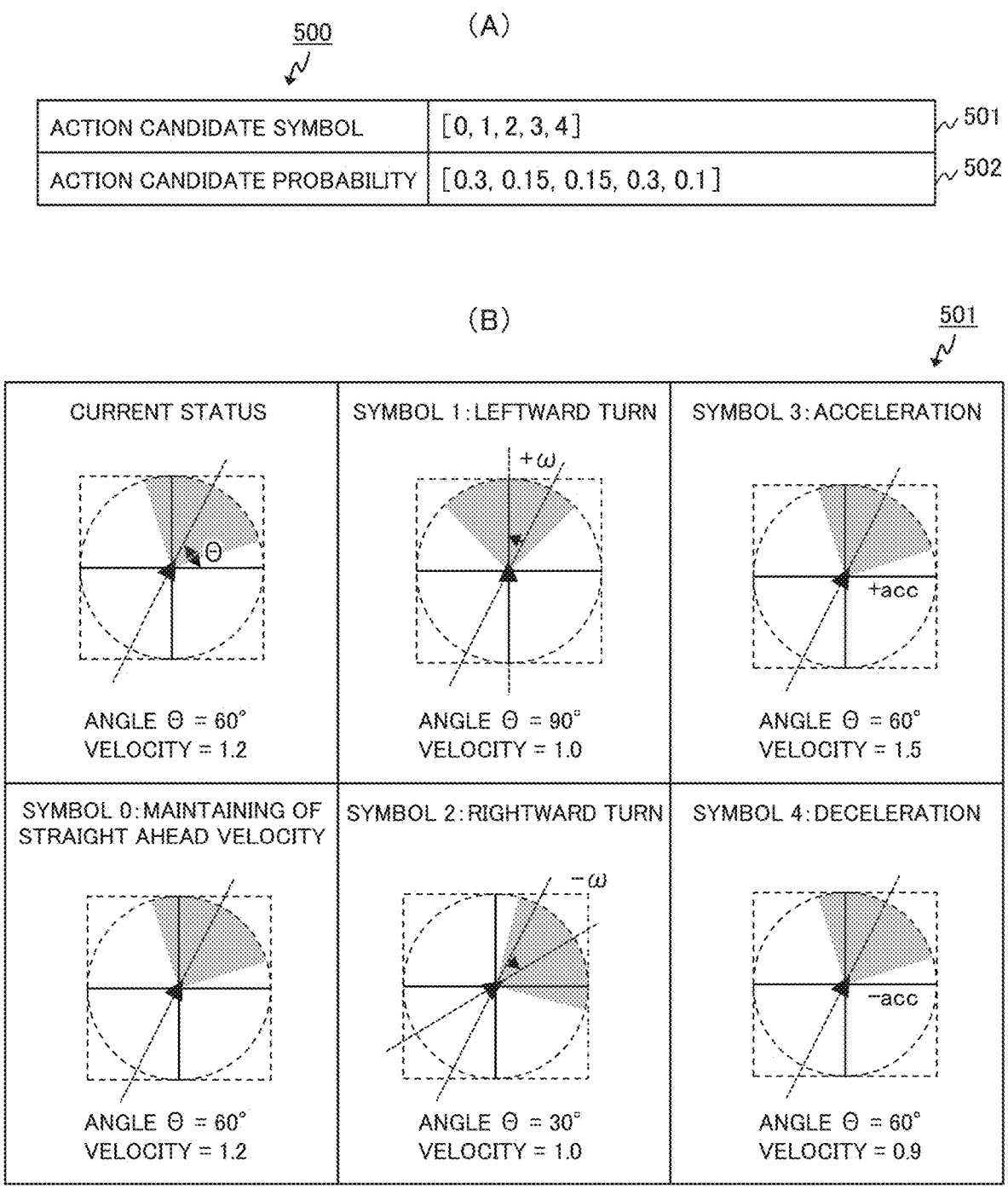
FIG. 5 shows diagrams describing an example of action candidates generated at an action plan processing section according to Example 1.

FIG. 5 shows diagrams for describing an example of action candidates generated at the action plan processing section 303 according to Example 1. As illustrated in (A) of FIG. 5, an action candidate 500 has, for example, information regarding a symbol 501 and probability 502. The symbol 501 represents the next actions. As illustrated in (B) of FIG. 5, for example, the symbol 501 indicates five actions as two-dimensional action, i.e., a symbol "0" representing an action of maintaining a straight-ahead velocity, a symbol "1" representing an action of making a leftward turn, a symbol "2" representing an action of making a rightward turn, a symbol "3" representing an action of making straight-ahead acceleration, a symbol "4" representing an action of making straight-ahead deceleration. In this case, the symbol 501 is presented in a five-dimensional symbol sequence. In the case in FIG. 5, a plurality of symbols representing the next action of action candidates of the robot include a straight-ahead motion, acceleration, deceleration, a rightward turn, and a leftward turn.

The probability 502 corresponds to the symbol 501. For example, FIG. 5(A) illustrates that the symbol "0" representing maintenance of the straight-ahead velocity is executed at a rate of 30 percent. The action candidate is herein expressed in a probability corresponding to an action symbol, but it is not necessarily expressed using probability.

Specifically, a robot action candidate essentially consists of, for example, a plurality of symbols representing next actions and probabilities respectively corresponding to the plurality of symbols representing the actions. For an action candidate integrated at the integration module based on the first action candidate, the second action candidate and the third action candidate, a single symbol is selected from among the plurality of symbols representing next actions based on, for example, the probabilities, to decide a next action of the robot.

At the action plan processing step S403, in order to generate an action command 350, the following three processes are executed to combine the action candidates.

1. Other Robot Avoidance Processing

In the other robot avoidance processing, a first action candidate 340 for avoiding other robots is generated with the generated relative position information 330 as an input thereto. Specifically, the other robot avoidance module 310 executes generation of the first action candidate 340 for avoiding another robot.

Figure 6:
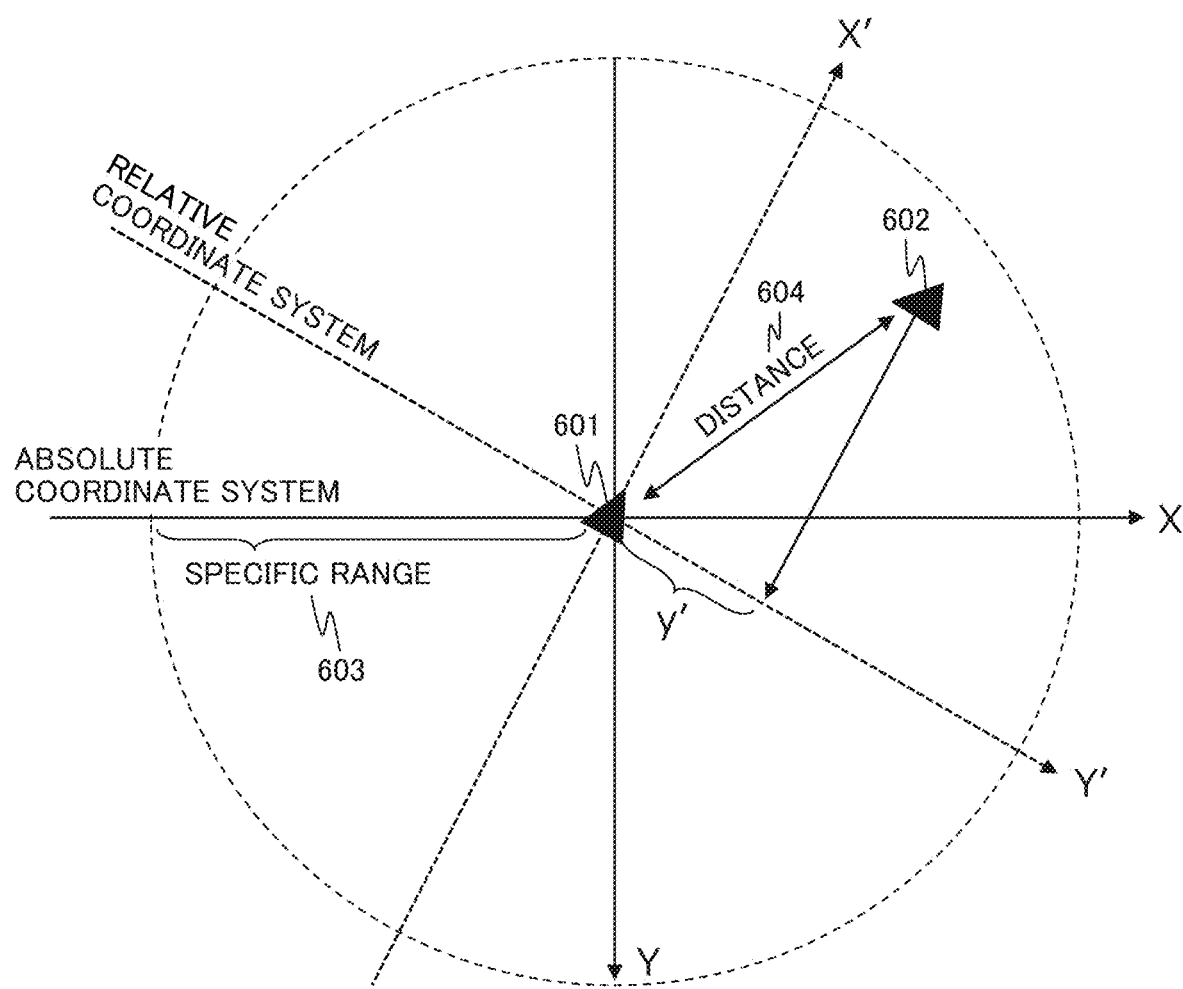
FIG. 6 is a diagram describing the relative relationship between robots in other robot avoidance processing according to Example 1.

FIG. 6 is a diagram describing the relative relationship between robots in the other robot avoidance processing according to Example 1. In FIG. 6, relative to its own robot 601, if another robot 602 intrudes into a specific range 603, the relative positional relationship is determined and the probability of the action candidate is changed. Specifically, for example, another robot is observed in the direction on the right side of its own robot 601 (y'>0), the probability corresponding to the symbol "1" representing the leftward turn is increased, whereas the probability corresponding to the symbol "2" representing the rightward turn or corresponding to another symbol is decreased. Also, if another robot is observed in the direction on the left side of its own robot (y'<0), the probability corresponding to the symbol "2" representing the rightward turn is increased, whereas the probability corresponding to the symbol "1" representing the leftward turn or corresponding to another symbol is decreased.

The extent of variation in probability increasing or decreasing depends on a distance 604. For example, if the distance is long, the extend of variation in probability is set to be smaller, whereas if the distance is shorter, the extent of variation in probability is set to be higher, so that the repulsive force between the two robots is increased. Ultimately, if the probability of the corresponding change in direction is set as "1" and all the other probabilities are set as "0", the two robots completely repel each other, so that the search can be pointed in the opposite directions.

Also, although FIG. 6 shows only one of the other robots, the same may be considered when a plurality of robots exists within the specific range. After variations are determined for all the other robots, the sum may be obtained for each corresponding action, and finally normalization may be achieved. Also, even if attention is directed toward a robot located at the closest distance, and the avoidance processing is performed to avoid only this robot, there is no problem.

2. Past Path Avoidance Processing

In the past path avoidance processing, a second action candidate 341 for avoiding its own past path is generated with the generated past path information 331 as an input thereto. Specifically, the past path avoidance module 311 executes generation of the second action candidate 341 for avoiding its own past path.

Figure 7:
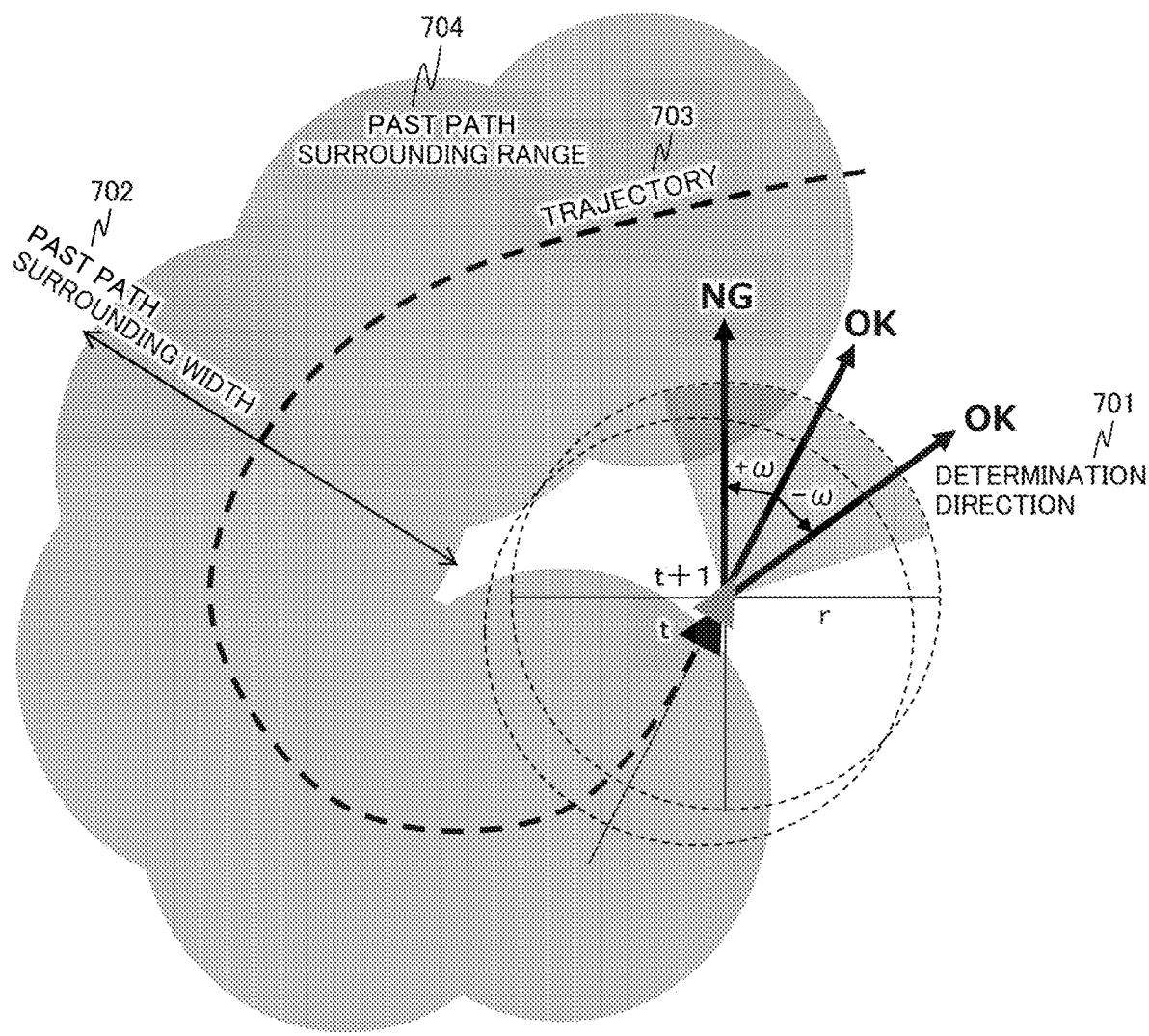
FIG. 7 is a diagram describing the relationship between its own robot and a past path in past path avoidance processing according to Example 1.

FIG. 7 is a diagram describing the relationship between its own robot and a past path in past path avoidance processing according to Example 1. In FIG. 7, assuming that the robot at current time t acts based on selection of an action candidate, it is determined at time t+1 after the action in question whether or not a past path exists in surroundings. The past path information 331 generated from the IMU information has a trajectory 703. A past path surrounding range 704 defined by a past path surrounding width 702 is set with respect to the trajectory 703. For each action of action candidates, it is determined whether or not a determination direction 701 and the past path surrounding range 704 overlap each other. If the determination direction 701 overlaps the past path surrounding range 704, the probability corresponding to the corresponding action symbol is decreased.

Ultimately, if all the probabilities of the actions with overlap are set as "0" and the probability is divided among the actions without overlap, as long as an action enabling a search to be made can exist in the action candidates, it is possible to conduct a search with priority given to an unknown search region while the past path is completely avoided.

Also, rather than making a determination for each action of the action candidates, the conditions surrounding the past path is observed simply in a determination range around the circumference at time t, and the probability may be varied such that if the proportion of overlap of a region on the right side of its own robot within the determination range is high, the probability corresponding to the symbol "1" representing the leftward turn is increased, whereas if the proportion of overlap of a region on the left side of its own robot is high, the probability corresponding to the symbol "2" representing the rightward turn is increased.

3. Obstacle Avoidance Processing

In the obstacle avoidance processing, a third action candidate 342 for avoiding obstacles located in surroundings is generated with the generated shape information 332 as an input thereto. Specifically, the obstacle avoidance module 312 executes generation of the third action candidate 342 for avoiding obstacles.

Figure 8:
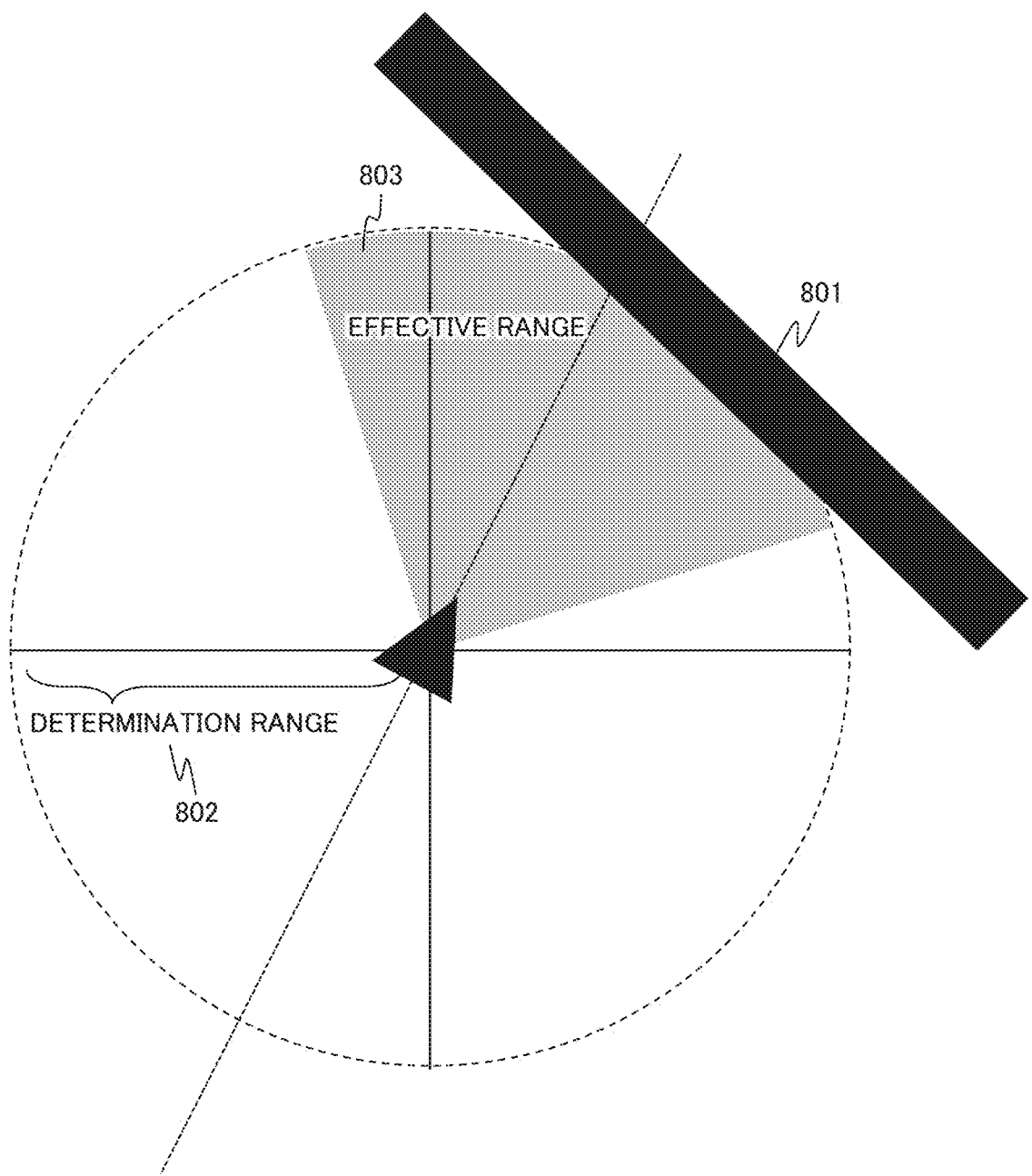
FIG. 8 is a diagram describing the relationship between its own robot and an obstacle in obstacle avoidance processing according to Example 1.

FIG. 8 is a diagram describing the relationship between its own robot and an obstacle in the obstacle avoidance processing according to Example 1. In FIG. 8, if an obstacle 801 enters into the determination range 802, the velocity is set as zero and further the shape information 332 is used to vary the probability for the action of the action candidate. For this purpose, an effective range 803 is set, and a direction of rotation depends on whether or not an obstacle is located in the range. An obstacle observed by the depth sensor is acquired, and the probability is varied such that if the obstacle is observed in a location closer to the region on the right side of its own body, the probability corresponding to the symbol "1" representing the leftward turn is increased, whereas if the obstacle is observed in a location closer to the region on the left side of its own robot, the probability corresponding to the symbol "2" representing the rightward turn is increased. At this time, the probability of any action other than the symbols "1" and "2" are set as zero to prevent any action other than rotation from being selected.

Also, rather than setting the velocity as zero, the distance from the obstacle may be acquired from the depth sensor, and thus the velocity may be adjusted to be reduced in stages so as to avoid the obstacle. It is noted that if no obstacle exists within the determination range 802, the obstacle avoidance processing is not performed.

Finally, the generated first action candidate 340 for avoiding other robots, the generated second action candidate 341 for avoiding its own past path, and the generated third action candidate 342 for avoiding obstacles are integrated to create an action candidate, and a weighted selection from them is executed, thereby deciding an action command 350 for an action to be executed next. Specifically, the integration module 313 executes the integration of action candidates and the selection. Stated another way, based on the third action candidate, initially, an action of avoiding an obstacle is selected, then based on the first action candidate, an action of avoiding another robot, and then based on the second action candidate, an action of avoiding a past path is selected. And, for an action candidate into which the selected actions are integrated, for example, based on the probability, a symbol is selected from among the plurality of symbols representing the next actions to decide a next action of the robot.

Figure 9:
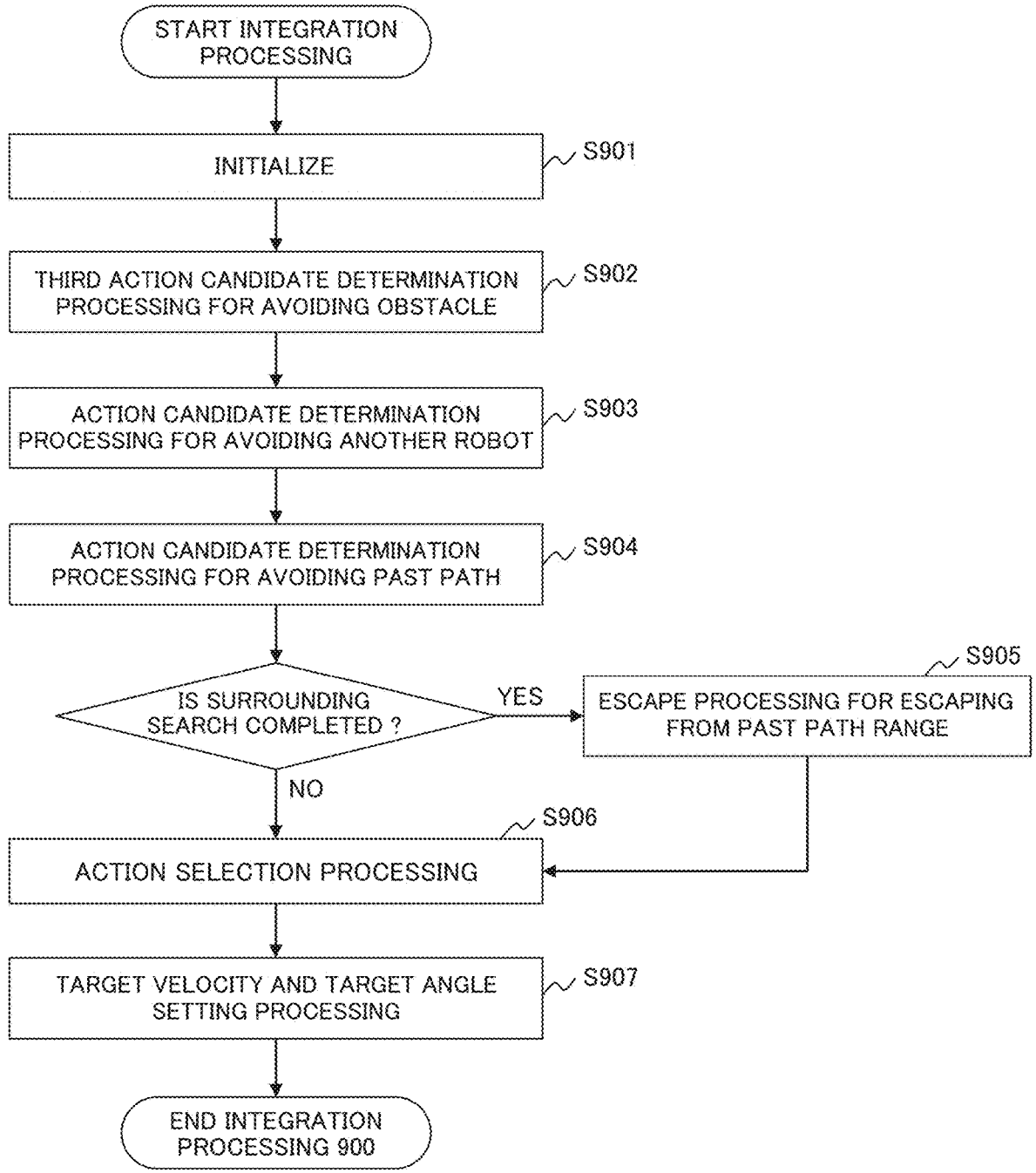
FIG. 9 is a flowchart illustrating an example flow of processing in an integration module 313 of an action plan processing section according to Example 1.

FIG. 9 is a flowchart illustrating an example flow of integration processing in the integration module 313 of the action plan processing section according to Example 1.

Included are: an initialization step S901, a third action candidate determination processing step S902 for avoiding an obstacle, an action candidate determination processing step S903 for avoiding another robot, an action candidate determination processing step S904 for avoiding a past path, an escape processing step S905 for escaping from the past path range, an action selection processing S906, and a target velocity and target angle setting processing S907.

FIG. 9 shows the procedure for sequentially determining and processing the generated first action candidate 340 for avoiding another robot, the generated second action candidate 341 for avoiding its own past path and the generated third action candidate 342 for avoiding an obstacle. A goal in the integration processing according to the example is that, for example, target velocity information and a target angle are set as an action command 350.

Initially, in the initialization step S901, the target velocity information and the target angle are initialized to current velocity information and current angle information which are estimated from sensor values. Also, an integrated action candidate is initialized such that the probability becomes zero.

Subsequently, in the third action candidate determination processing step S901 for avoiding an obstacle, the third action candidate 342 for avoiding an obstacle is used to determine whether or not an obstacle exists in the direction of travel within the effective range. If the obstacle exists, the probability of an action other than rotation becomes zero or sufficiently small through the aforementioned obstacle avoidance processing, so that the value is used. If the obstacle exists, initially, the target velocity information is written over zero and fixed. Also, the integrated action candidate is updated to the value of the third action candidate 343, and values of the probabilities corresponding to the symbols "0", "3" and "4" are fixed to prevent the probabilities other than rotation from being varied.

Subsequently, in the action candidate determination processing step S903 for avoiding another robot, the first action candidate 340 for avoiding another robot is used to update the integrated action candidate. At this time, the elements which have been fixed in the preceding processing are not updated. As a way of update, an arithmetic addition, an arithmetic addition with the addition of specific weighting, selection, and the like are included.

Subsequently, in the action candidate determination processing step S904 for avoiding a past path, the second action candidate 341 for avoiding its own past path is used to update the integrated action candidate. At this time, the elements which have been fixed in the preceding processing are not updated. As a way of update, an arithmetic addition, an arithmetic addition with the addition of specific weighting, selection, and the like are included. Also, at this time, from the second action candidate 341, if all the probabilities are small, this means that there is no unsearched region in surrounding regions. In this case, the escape processing step S905 for escaping from the past path range is executed.

It is noted that although the description has been provided of an example where the action candidate determination processing is performed in the order of the third action candidate 342, the first action candidate 340 and the second action candidate 341, the priorities may be assigned respectively to them and the priorities may be lowered in the order of the third action candidate 342, the first action candidate 340 and the second action candidate 341. In this case, weighting to the probability is adjusted to set an order of precedence, and thus the action command 350 is generated. In this manner, setting the order of precedence enables avoidance of an event that more significantly affects the continuous operation of the robotic system, and therefore the robotic system can be controlled to operate without any trouble.

In the escape processing step S905 for escaping from the past path range, when an unsearched boundary region is missing in surrounding regions and any action candidate in the action candidate determination processing for avoiding the above-described past path has a small probability, a specific action is taken to move the robot into the range of the unsearched region. Specifically, where the action of avoiding the past path is selected based on the second action candidate, if all the surrounding areas are included in the past path, an action candidate for escaping to the outside of the past path is created to be pursuant to a specific rule.

Figure 10:
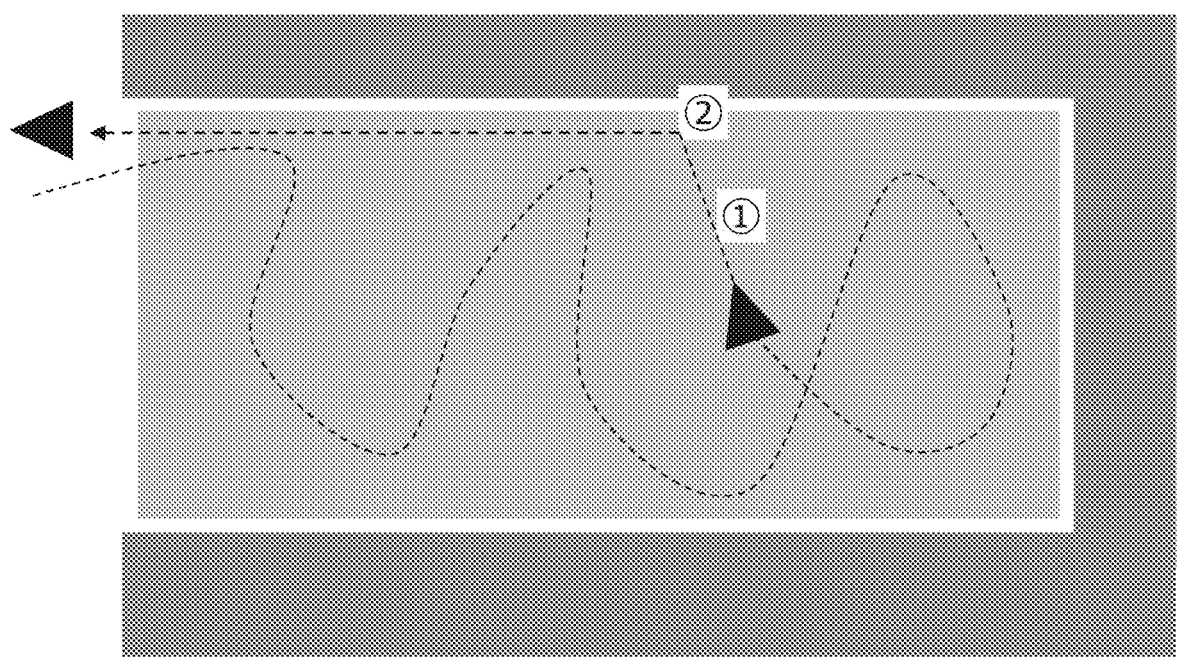
FIG. 10 is a diagram describing a process of escaping from a past path range according to Example 1.

FIG. 10 is a diagram describing the escape processing for escaping from a past path range according to Example 1 of the present invention. As illustrated in FIG. 10, the probability of the integrated action candidate is changed such that if the straight-ahead motion is possible, it is executed, and if the straight-ahead motion is impossible due to an obstacle, a change in direction is made. Thus, escape to the unsearched area along the wall may be achieved.

In the action selection processing S906, then, a probabilistic selection is conducted from among the obtained integrated action candidates to determine a single action to be executed next.

Finally, in the target velocity and target angle setting processing S907, the target velocity and the target angle are updated in accordance with the selected action to generate the action command 350.

Also, although the procedure for determining the integrated action candidates while the determinations are sequentially performed has been illustrated in Example 1, the method of determining the integrated action candidate is not limited to this. For example, the integrated action candidate may be created using a model learning during actual movement using reinforcement learning.

Reference is made to FIG. 4 again.

Robot Control Output Processing Step S404

At the robot control output processing step S404, the aforementioned generated action command 350 as an input thereto is converted into a velocity instruction 360 to be processed by the drive control unit 206, which is then passed to the drive control unit 206. The velocity instruction 360 passed to the drive control unit 206 is velocity information having a velocity component, angular acceleration component. Specifically, the robot control output processing section executes the processing of issuing the velocity instruction 360.

Here, in the aforementioned action plan processing step S403, if the action command 350 can be processed directly by the drive control unit 206, this step may be omitted.

The velocity instruction 360 is issued by the sensor input processing step S402, the action plan processing step S403 and the robot control output processing S404 which have been described above, and a single action selected in the action plan processing step S403 is executed. At a search termination determination step S407, if the search is not terminated, the procedure returns to the sensor input processing step S402, whereas if the search is terminated, the procedure moves to a system stop step S406.

Here, a criterion for determination of search termination is, for example, when a specific target is found, when a predetermined length of time has elapsed, based on checking of the remaining amount of power supply, or the like.

Fail-Safe Processing Step S405

At the fail-safe processing step S405, a dangerous condition is determined and detected with the sensor input 370 as an input thereto. Specifically, the detection is executed by the fail-safe processing section 305. If a condition is determined to be dangerous, the fail-safe processing section 305 operates the system control section 301 to stop the robot. When the system control section 301 receives the detection information from the fail-safe processing section 305, the system control section 301 generates an interrupt to the robot control output processing section 304 to write all the velocity instructions 360 over zero.

For fail-safe, as described above, an input of the depth sensor is used as a sensor input to make emergency stop when an obstacle suddenly appears in the direction of travel and/or the like, and/or the remaining battery life is used as a sensor input to stop the system with safety before reaching a limit of activity, and/or the like. Stated another way, when the fail-safe processing section monitors the depth information and senses that an obstacle suddenly appears in the direction of travel or when it monitors the remaining battery life and senses that the robot has little time to operate, the fail-safe processing section transmits a signal to generate an interrupt to the robot control, thereby writing the velocity or acceleration information over zero for safe system stop.

System Stop Step S406

At the system stop step S406, the system is stopped. As an action during stop, for example, a stop may be made on the spot, may be made after returning to the start point, and the like. For stopping, the robotic system 300 may transmit its own past path to the external apparatus 307 through the external communication interface 306. As a result, the path through which each robotic system 300 has passed may be displayed, for example, on a screen connected to the external apparatus 307, and/or the like to allow the task completion to be ensured visually.

By executing the processing as described above, the distributed coordination robotic system according to the present invention is capable of using the relative position information, the past path information and the shape information, all of which are obtained from the robot sensor inputs, to create models predicting an action of avoiding another robot, an action of avoiding a past path, and an action of avoiding an obstacle, and of combining the results obtained from the above models to determine an action of each robot.

Figure 11:
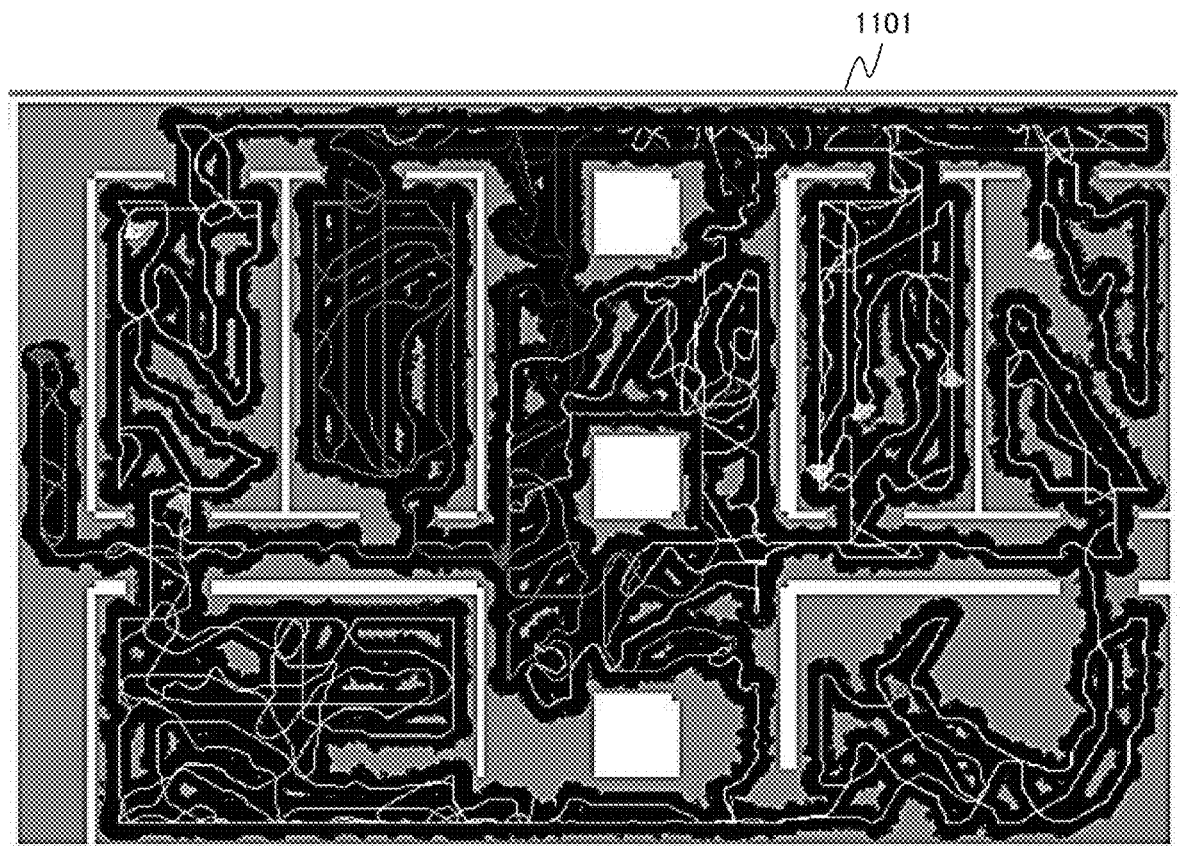
FIG. 11 is a diagram illustrating a result of a two-dimensional simulation of a broad-area search by ten robots installed with the robotic system according to Example 1.
Figure 12:
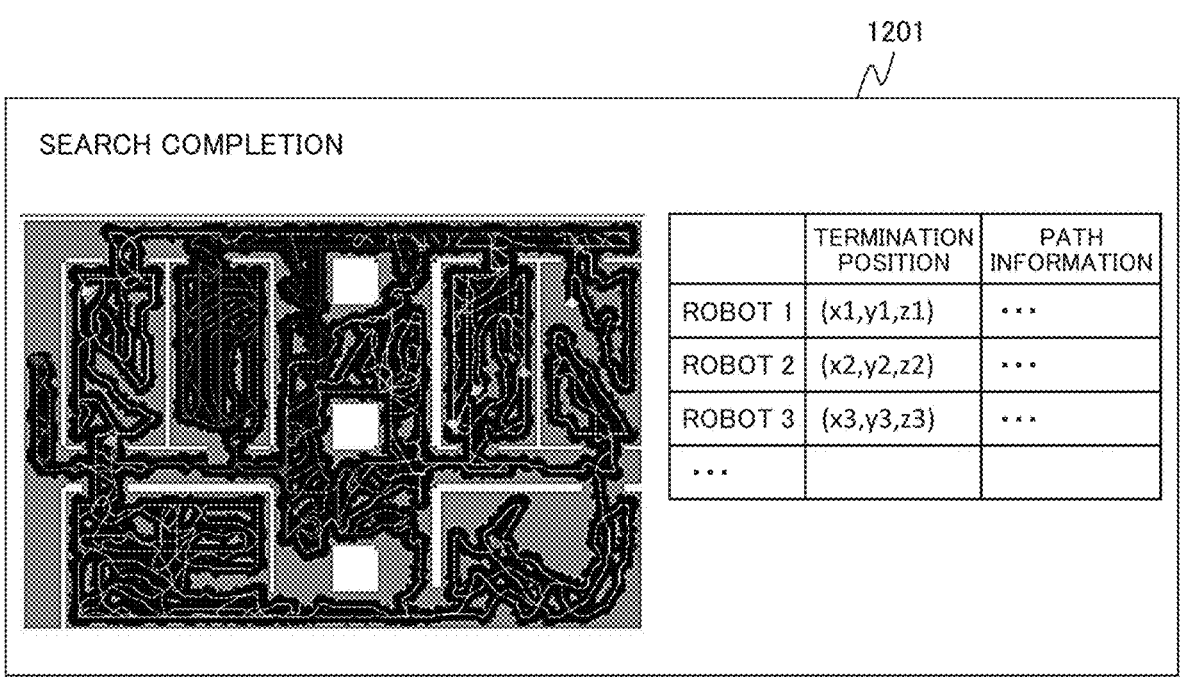
FIG. 12 a diagram illustrating an example display screen showing the result of the two-dimensional simulation of the broad-area search according to Example 1.

FIG. 11 illustrates a result 1101 of an example of the two-dimensional simulations of a broad-area search by ten robots each installed with the robotic system according to Example 1. FIG. 12 illustrates a display screen 1201 showing the search completion of the example two-dimensional simulation.

According to Example 1, for example, based on the relative position information 330 relative to another robot which is generated from the sensor input about radio wave intensity, the robotic system 300 generates a first action candidate 340 for avoiding another robot, which is then used to determine an action, so that the robot and the another robot repel each other, and therefore, within the repulsive range, the individual robots share the territory with one another to enable a coordinated search without interference.

According to Example 1, for example, based on the path information 331 generated from the IMU sensor input, the robotic system 300 generates an action candidate 341 for avoiding past path, which is then used to determine an action, so that a search may be conducted while decreasing overlap with its own path and expanding the search area.

According to Example 1, for example, based on the shape information 332 generated from the sensor input of the depth sensor, the robotic system 300 generates an action candidate 342 for avoiding an obstacle, which is then used to determine an action, so that a search may be conducted while avoiding interference with the obstacle for collision avoidance.

According to Example 1, the action candidate 340 for avoiding another robot, the action candidate 341 for avoiding a past path, and the action candidate 342 for avoiding an obstacle are combined by the integration module 313 to select an action, so that searches of the respective action candidates complement one another to achieve a coordinated and autonomous search while avoiding interference with the other robots and obstacles, creating territory against the other robots and efficiently expanding the search area based on a reference to the past path.

With the distributed coordination robotic system and the task execution method according to the present invention which have been detailed, even if there is no prior plan by a centralized calculator and/or no map sharing in the broad-area search task in an unknown environment, the distributed coordination robotic system may be implemented which allows each robot to conduct a coordinated search without interference with the other robots and obstacles while expanding the search area. The autonomous broad-area search is implemented to allow a robot to create its territory by a repulsive action with respect to the other robots while avoiding obstacles and expanding the search area based on a reference to the past path.

It is to be understood that the present invention is not limited to the above examples and is intended to embrace various modifications.

Further, for example, the above examples have been described of detailed configurations for the purpose of providing a better understanding of the invention, and the present invention is not necessarily limited to including all the components and configurations described above.

It is also to be understood that, for a portion of the configuration in each example, addition, deletion and substitution of another configuration may be made.

In the above examples, the control lines and information lines deemed necessary for the description are illustrated herein, and all the control lines and information lines may not be necessarily shown.

REFERENCE SIGNS LIST

100 . . . building interior,
101 . . . wall,
102 . . . post,
103 . . . start point,
104 . . . robot,
105 . . . trajectory,
106 . . . room,
201 . . . housing,
202 . . . drive unit,
203 . . . sensor,
300 . . . robotic system,
301 . . . system control section,
302 . . . sensor input processing section,
303 . . . action plan processing section,
304 . . . robot control output processing section,
305 . . . fail-safe processing section,
306 . . . external communication interface,

The invention claimed is:

1. A distributed coordination system for executing a predetermined task by a plurality of mobile bodies, comprising:
   a sensor input processing section for acquiring relative position information relative to another mobile body, past path information and shape information of surroundings; and
   an action plan processing section including;
      other mobile body avoidance module for generating, based on the relative position information, a first action candidate for avoiding another mobile body, the first action candidate having a first action set of a plurality of actions and a first probability set of a plurality of probabilities respectively corresponding to each of the plurality of actions in the first action set,
      a past path avoidance module for generating, based on the path information, a second action candidate for avoiding the past path, the second action candidate having a second action set of the plurality of actions and a second probability set of a plurality of probabilities respectively corresponding to each of the plurality of actions in the second action set,
      an obstruction avoidance module for generating, based on the shape information, a third action candidate for avoiding a surrounding obstruction, the third action candidate having a third action set of the plurality of actions and a third probability set of a plurality of probabilities respectively corresponding to each of the plurality of actions in the third action set, and
      an integration module for determining a velocity or an angular velocity of the mobile body based on the first action candidate, the second action candidate and the third action candidate.

2. The distributed coordination system according to claim 1,
   wherein the mobile body is a robot installed with the sensors.

3. The distributed coordination system according to claim 1,
   wherein the plurality of actions of the first action set, the second action set and the third action set essentially consist of a plurality of symbols representing the plurality of actions which are next actions, and
   wherein the integration module selects a single symbol from among the plurality of symbols representing the next actions based on the probabilities of the first action candidate, the second action candidate and the third action candidate, to decide a next action of the mobile body.

4. The distributed coordination system according to claim 3,
   wherein the plurality of symbols representing the plurality of next actions of the first action candidate, the second action candidate and the third action candidate of the mobile body include a straight-ahead motion, acceleration, deceleration, a rightward turn, and a leftward turn.

5. The distributed coordination system according to claim 1,
   wherein the relative position information is calculated and obtained from data on intensity of radio waves emitted by a communication module of another mobile body,
   based on the relative position information, a position and a distance of another mobile body relative to its own mobile body are determined, and based on the determination, probabilities of the first probability set are changed to decide a next action of the mobile body.

6. The distributed coordination system according to claim 1,
   wherein the sensors include a sensor for intensity of radio waves, an inertial measurement unit (IMU) and a depth sensor.

7. The distributed coordination system according to claim 1,
   wherein the path information is calculated and obtained from sensor data of the sensors,
   based on the path information, it is determined whether or not a next action of its own body is taken around a position through which its own body has passed previously,
   based on the determination, probabilities of the second probability set are changed to decide a next action of the mobile body.

8. The distributed coordination system according to claim 1,
   wherein the shape information is calculated and obtained from sensor data of the sensors,
   based on the shape information, it is determined whether or not an obstacle is located within a safe range for a next action of its own body,
   based on the determination, probabilities of the third probability set are changed to decide a next action of the mobile body.

9. The distributed coordination system according to claim 3,
   wherein based on the third action candidate, an action of avoiding an obstacle is selected,
   based on the first action candidate, an action of avoiding another mobile body is selected,
   based on the second action candidate, an action of avoiding a past path is selected, and
   for an action candidate into which the actions thus selected are integrated, based on the probabilities, a symbol is selected from among the plurality of symbols representing next actions of the mobile body to decide a next action of the mobile body.

10. The distributed coordination system according to claim 3,
    wherein the first action candidate, the second action candidate and the third action candidate are integrated based on a learned model, and
    for the integrated action candidate, based on the probabilities, a symbol is selected from among the plurality of symbols representing next actions to decide a next action of the mobile body.

11. The distributed coordination system according to claim 6,
    wherein where an action of avoiding a past path is selected based on the second action candidate, if all the surroundings are included in the past path, an action candidate for escaping to the outside of the past path is created to be pursuant to a specific rule.

12. The distributed coordination system according to claim 1, comprising
    a fail-safe processing section transmitting a signal to generate an interrupt to control when monitoring depth information and sensing that an obstacle suddenly appears in the direction of travel or when monitoring the remaining battery life and sensing that the mobile body has little time to operate, wherein based on the interruption, the velocity or acceleration information is written over zero for safe system stop.

13. A task execution method for executing a predetermined task by a plurality of mobile bodies, comprising:
- a sensor input processing step of acquiring, based on sensor data of sensors installed with the mobile body, relative position information relative to another mobile body, past path information and shape information of surroundings; and
- an action plan processing step including;
  - other mobile body avoidance processing for generating, based on the relative position information, a first action candidate for avoiding another mobile body, the first action candidate having a first action set of a plurality of actions and a first probability set of a plurality of probabilities respectively corresponding to each of the plurality of actions in the first action set,
  - past path avoidance processing for generating, based on the path information, a second action candidate for avoiding the past path, the second action candidate having a second action set of the plurality of actions and a second probability set of a plurality of probabilities respectively corresponding to each of the plurality of actions in the second action set,
  - obstruction avoidance processing for generating, based on the shape information, a third action candidate for avoiding a surrounding obstruction, the third action candidate having a third action set of the plurality of actions and a third probability set of a plurality of probabilities respectively corresponding to each of the plurality of actions in the third action set, and
  - integration processing for determining a velocity or an angular velocity of the mobile body based on the first action candidate, the second action candidate and the third action candidate.

14. The task execution method according to claim 13,
wherein initially, based on the third action candidate, an action of avoiding an obstacle is selected,
then, based on the first action candidate, an action of avoiding another mobile body is selected,
then, based on the second action candidate, an action of avoiding a past path is selected, and
a next action of the mobile body is decided.

* * * * *